United States Patent
Tsubata et al.

(10) Patent No.: US 7,029,132 B2
(45) Date of Patent: Apr. 18, 2006

(54) PROJECTION TYPE IMAGE DISPLAY WITH ADJUSTABLE LENS HOLDING STRUCTURE

(75) Inventors: Fusamitsu Tsubata, Yokohama (JP);
Kazumasa Ueoka, Yokohama (JP);
Mikio Shiraishi, Yokohama (JP);
Hiroto Miura, Yokohama (JP);
Nobuyuki Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 81 days.

(21) Appl. No.: 10/812,425

(22) Filed: Mar. 30, 2004

(65) Prior Publication Data

US 2005/0001998 A1  Jan. 6, 2005

(30) Foreign Application Priority Data

Jul. 1, 2003 (JP) .............................. 2003-189159

(51) Int. Cl.
*G03B 21/14* (2006.01)
*G03B 21/22* (2006.01)
*G03B 21/00* (2006.01)
*G03B 1/48* (2006.01)
*G02B 27/02* (2006.01)
*G02B 7/02* (2006.01)

(52) U.S. Cl. ...................... 353/100; 353/119; 353/122; 353/24; 359/440; 359/813; 359/819

(58) Field of Classification Search ........ 353/100–101, 353/119, 122, 24, 96; 359/440, 811, 813, 359/819, 694, 741–742, 820; 720/681
See application file for complete search history.

(56) References Cited

U.S. PATENT DOCUMENTS 6,247,817 B1 *  6/2001  Ogawa et al. ................ 353/38

FOREIGN PATENT DOCUMENTS

| JP | 2000-2932 A | 1/2000 |
|---|---|---|
| JP | 2001-264726 A | 9/2001 |
| JP | 2003-75696 A | 3/2003 |

* cited by examiner

*Primary Examiner*—W. B. Perkey
*Assistant Examiner*—Magda Cruz
(74) *Attorney, Agent, or Firm*—McDermott Will & Emery LLP

(57) ABSTRACT

Adjustment of the illumination range to a liquid crystal panel of a liquid crystal projector requires time in fixing upon adjustment and accordingly it is an object to make the adjustment effectively. In an adjustment mechanism of the illumination range of illumination means to the liquid crystal panel in an optical engine unit of the liquid projector, the spring property is provided in a lens holder for holding a lens and the lens is temporarily held by friction of the spring portion to the optical engine case after adjustment. Then, the adhesion processing is made to complete the adjustment.

20 Claims, 9 Drawing Sheets

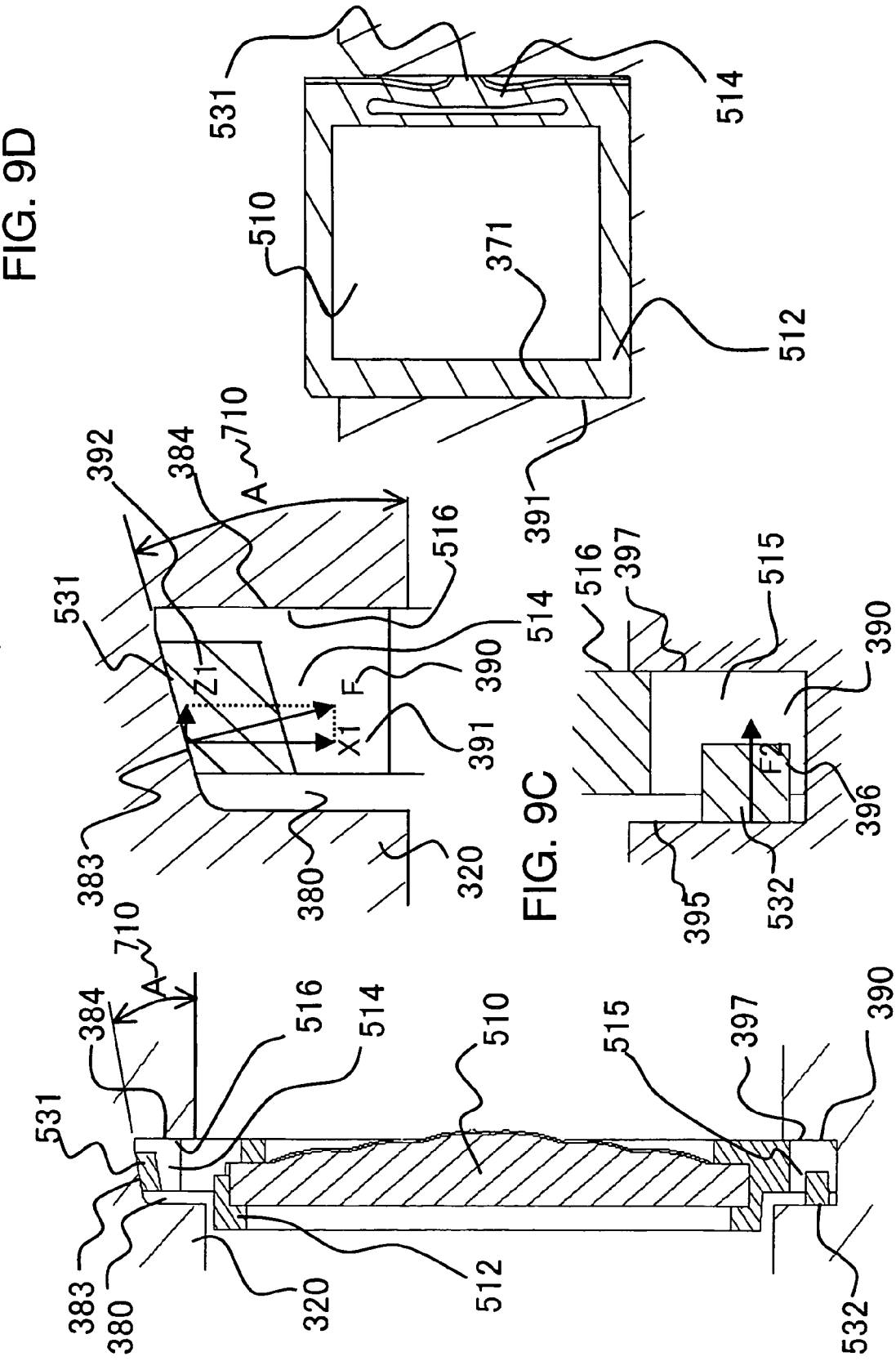

PROJECTION TYPE IMAGE DISPLAY WITH ADJUSTABLE LENS HOLDING STRUCTURE

BACKGROUND OF THE INVENTION

The present invention relates to a display apparatus for projecting an image on a screen by means of a light valve element such as a liquid crystal panel and particularly to a projection type image display apparatus such as a liquid crystal projector apparatus and a rear projection type display apparatus.

Heretofore, a projection type image display apparatus such as a liquid crystal projector and a rear projection type display apparatus is known in which light from a light source such as an electric light bulb is intensity-modulated to be changed to shaded light in each pixel in accordance with an image signal by means of light valve means such as a liquid crystal panel, so that an optical image is formed to be projected on a screen in enlarged manner.

In a recent projection type image display apparatus, generally, light from light source means separated into a plurality of colors (e.g. three colors) by spectroscope means is modulated by light valve means corresponding to respective colors (hereinafter, description is made by using a liquid crystal panel instead of light valve means for convenience) and the light having a plurality of color components is then compounded by a compound prism to be projected to the outside of the apparatus by a projection lens and displayed as in image.

At this time, there is provided light guide means for transmitting light from the light source means to the light crystal panel. The light guide means has the function of uniformalizing non-uniform brightness within an illumination range and changing the illumination range to a rectangular illumination range larger than an opening of the rectangular liquid crystal panel. Further, the spectroscope means is provided between the light source means and the liquid crystal panel, and the light guide means and the spectroscope means are mounted to optical holding means together.

At this time, the optical axis from the illumination means to the liquid crystal panel is set wrongly due to manufacturing accuracy of the optical means provided halfway and the optical holding means and the illumination position of the liquid crystal panel is sometimes deviated from the opening range of the liquid crystal panel when the apparatus is simply assembled. Accordingly, the adjustment operation is performed in which the position and the posture of the optical components constituting the light guide means or the spectroscope means are usually adjusted to align the illumination position of the liquid crystal panel with the range sufficiently covering the opening range of the liquid crystal panel.

Heretofore, as prior arts concerning the adjustment of the illumination range of this kind, there are known the structure having an adjustment mechanism of the illumination position as described in, for example, JP-A-2000-2932 and JP-A-2001-264726 and the structure having an adjustment mechanism of the illumination position disposed outside of the apparatus and in which optical components are adhesively fixed after adjustment and the adjustment mechanism is removed as described in JP-A-2003-75696.

SUMMARY OF THE INVENTION

In the prior arts disclosed in JP-A-2000-2932 and JP-A-2001-264726, it is not sufficiently recognized heretofore that the adjustment mechanism is complex and in the prior art disclosed in JP-A-2003-75696, it is not sufficiently recognized heretofore that it takes time to harden the adhesively fixed portion.

It is an object of the present invention to solve the above problems by providing a low-cost projection type image display apparatus having high reliability and excellent repair and maintenance characteristics. Particularly, it is an object of the present invention to realize adjustment and fixing of optical component of light guide means from an illumination unit to a liquid crystal panel simply with high reliability.

As means for solving the problems, according to the present invention, in adjustment of optical component constituting light guide means, a spring portion is provided in part of an intermediate holding member of the optical component. The spring portion of the intermediate holding member is bent and the optical component is temporarily held to a case of rigid body for holding the whole optical system by reaction force. After it is temporarily held, an adjustment mechanism provided outside of the apparatus is separated or removed and the holding member of the optical component is adhesively fixed to the case of the rigid body with much time spent. The adjustment time and the occupation time of the adjustment mechanism are shortened. The holding member of the optical component is made of thermoplastic high molecular weight material and the holding member and the optical component are fixed to each other by welding to thereby hold the optical component stably with high reliability.

Other objects, features and advantages of the invention will become apparent from the following description of the embodiments of the invention taken in conjunction with-the accompanying drawings.

BRIEF DESCRIPTION OF THE DRAWINGS

FIGS. 9A, 9B, 9C and 9D are sectional views showing the illumination range adjustment unit of the projection type image display apparatus according to the second embodiment of the present invention.

DETAILED DESCRIPTION OF THE EMBODIMENTS

Figure 1A:
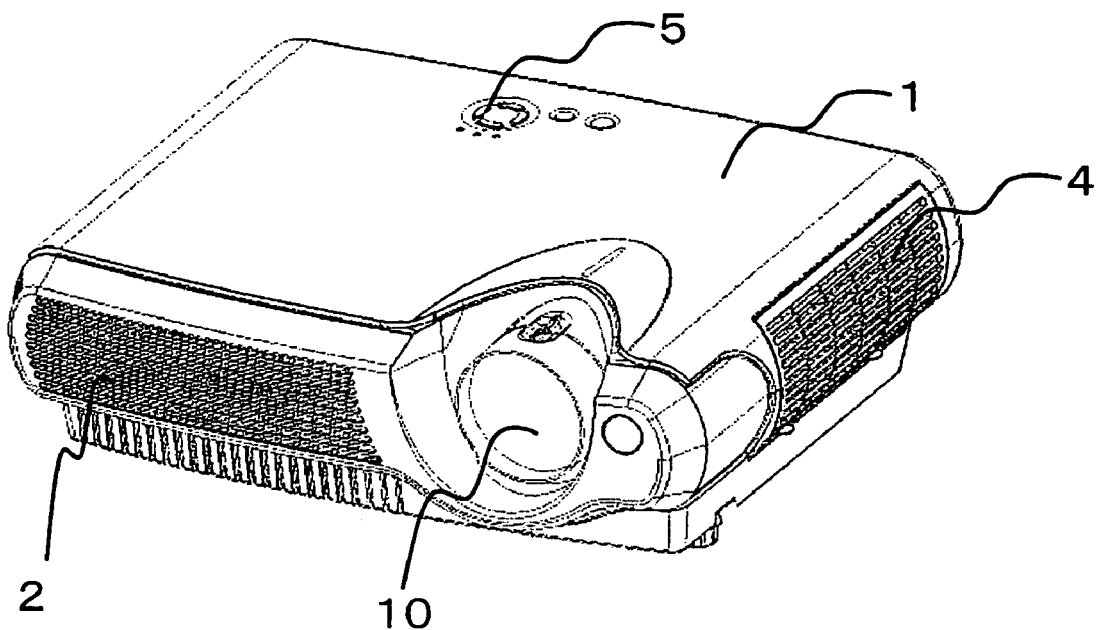
FIGS. 1A and 1B are perspective views showing the external appearance of a projection type image display apparatus according to a first embodiment of the present invention.

Embodiments of the present invention are now described with reference to the accompanying drawings. Constituent elements having common or identical function are given the same reference numerals throughout the whole drawings and further repeated description is omitted in order to avoid complexity.

FIGS. 1 to 7 are diagrams for explaining a first embodiment according to the present invention. Description is made successively from FIGS. 1A and 1B.

Figure 1B:
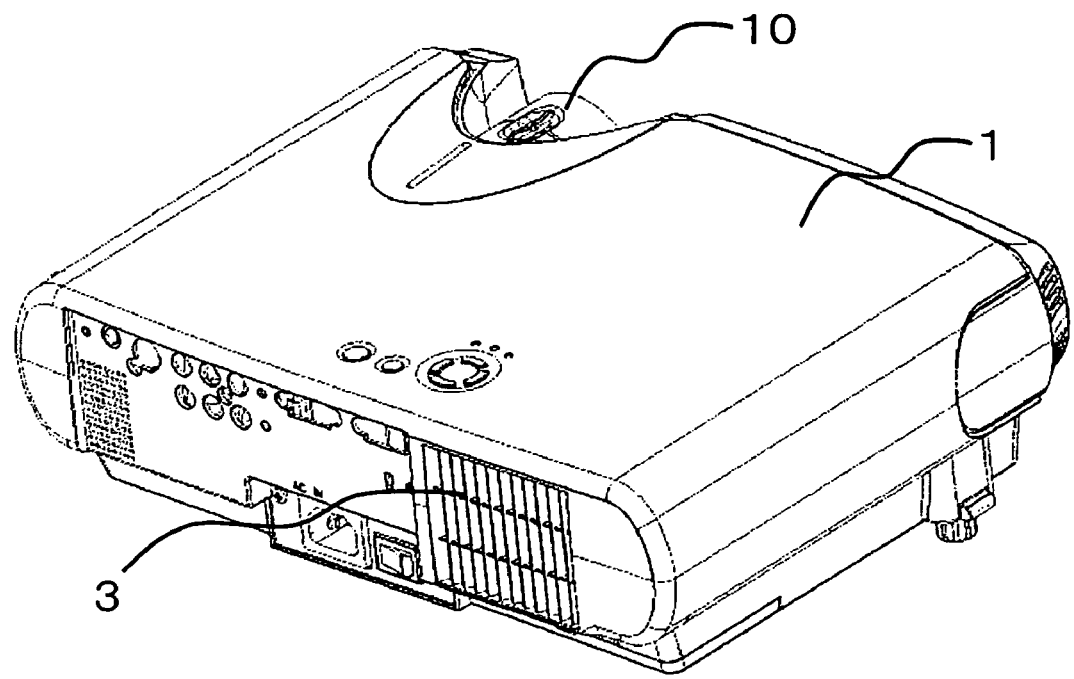

FIGS. 1A and 1B are perspective views showing the external appearance of a projection type image display apparatus of the first embodiment according to the present invention. FIG. 1A shows a front side of the projection type image display apparatus 1 and FIG. 1B shows a rear side of the projection type image display apparatus.

In FIGS. 1A and 1B, the projection type image display apparatus 1 of the present invention includes an exhaust port 2 disposed at the same side as a projection lens 10, that is, disposed at the front side thereof as shown in FIG. 1A and an intake port 3 disposed at the rear side as shown in FIG. 1B. Other elements including an operation button 5 and a panel intake port 4 are disposed at the exterior side of the apparatus 1.

The projection type image display apparatus 1 is operated by operating the operation button 5 from the outside of the apparatus. In operation, an image is projected on a screen not shown by the projection lens 10 to be displayed thereon.

Figure 2:
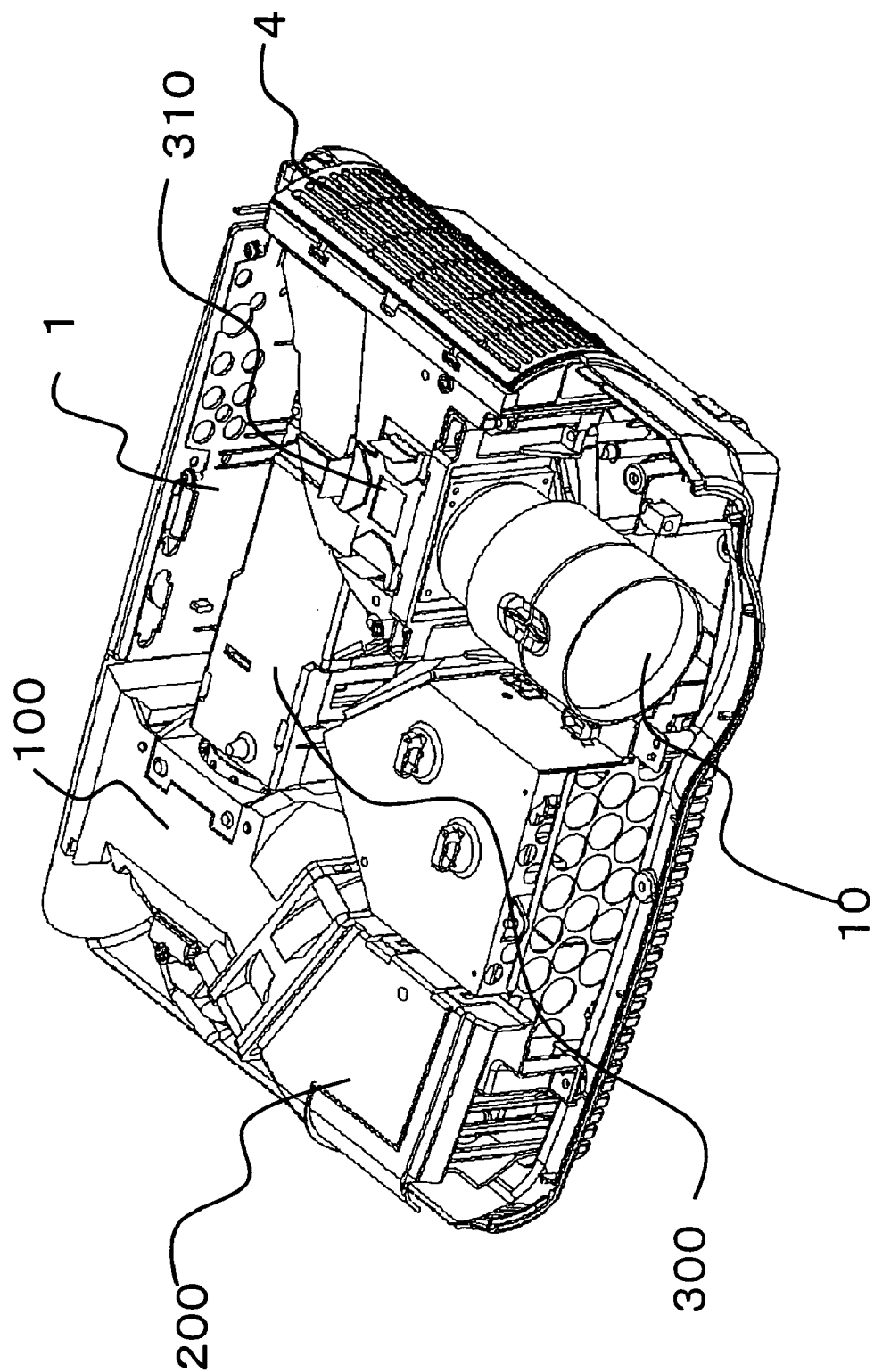
FIG. 2 is a perspective view showing the internal structure of the projection type image display apparatus according to the first embodiment of the present invention.

FIG. 2 is a perspective view showing the internal structure of the projection type image display apparatus 1 of the first embodiment according to the present invention shown in FIG. 1.

In FIG. 2, the projection type image display apparatus 1 includes an optical engine unit 300 therein. Illumination means 100 is mounted to the optical engine unit 300. In the optical engine unit 300, light from the illumination means 100 is separated into three colors by spectroscope means (not shown) and guided to a liquid crystal panel (not shown) constituting light valve means by means of light guide means to be modulated. The modulated lights are compounded by a prism (not shown). Finally, the compounded light is projected on a screen (not shown) installed outside of the apparatus by means of the projection lens 10 constituting projection means and displayed as an image. A prism unit 310 provided in the optical engine unit 300 includes liquid crystal panels disposed at three faces of the prism in corresponding manner to color lights. The projection lens 10 is mounted to the prism unit 310.

Figure 3:
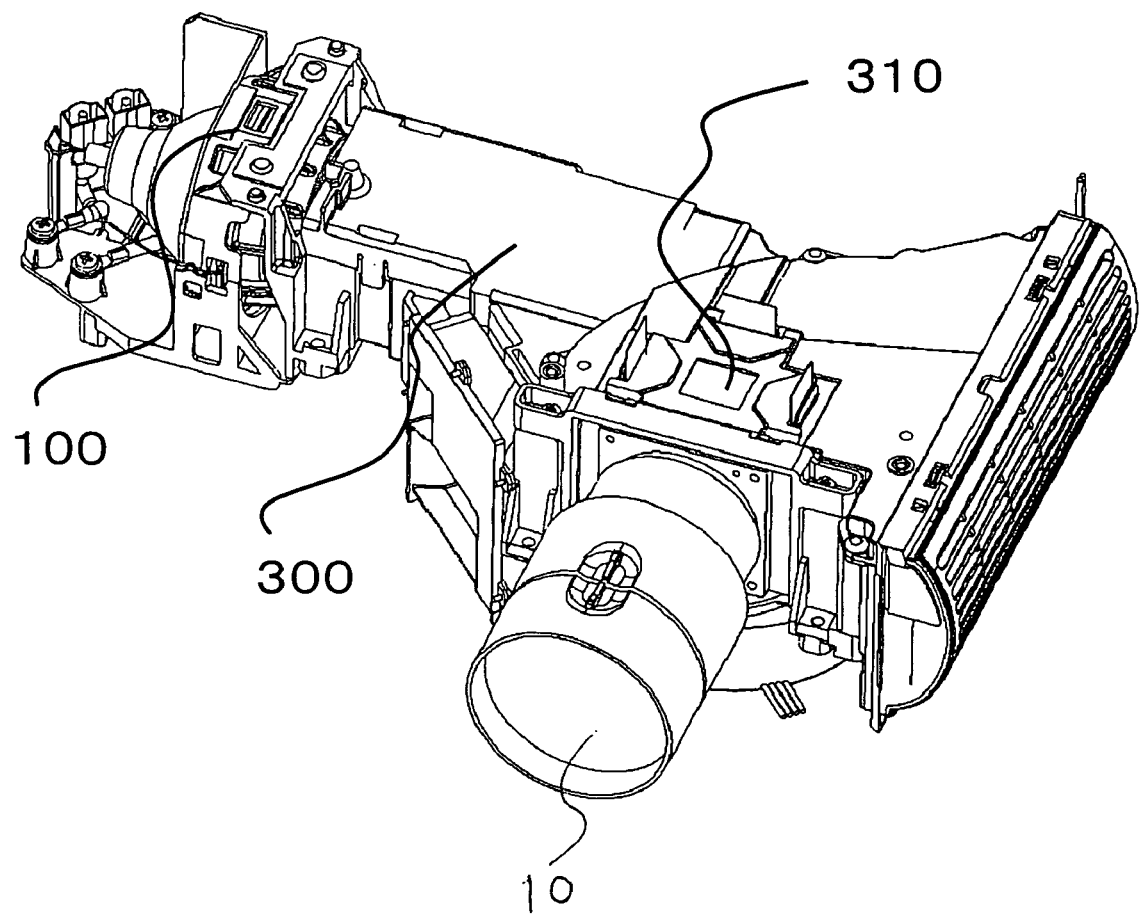
FIG. 3 is a perspective view showing structure of an optical engine unit in the projection type image display apparatus according to the first embodiment of the present invention.

FIG. 3 is a diagram for explaining the optical engine unit 300 in the projection type image display apparatus of the first embodiment according to the present invention shown in FIGS. 1A and 1B.

In FIG. 3, the optical engine unit 300 includes the illumination means 100, the spectroscope means (not shown), the light guide means, the liquid crystal panel (not shown) constituting the light valve means, the prism (not shown) constituting light compounding means and the projection lens 10 constituting the projection means. The prism unit 310 includes the liquid crystal panel (not shown), the prism (not shown) and the projection lens 10.

Figure 4:
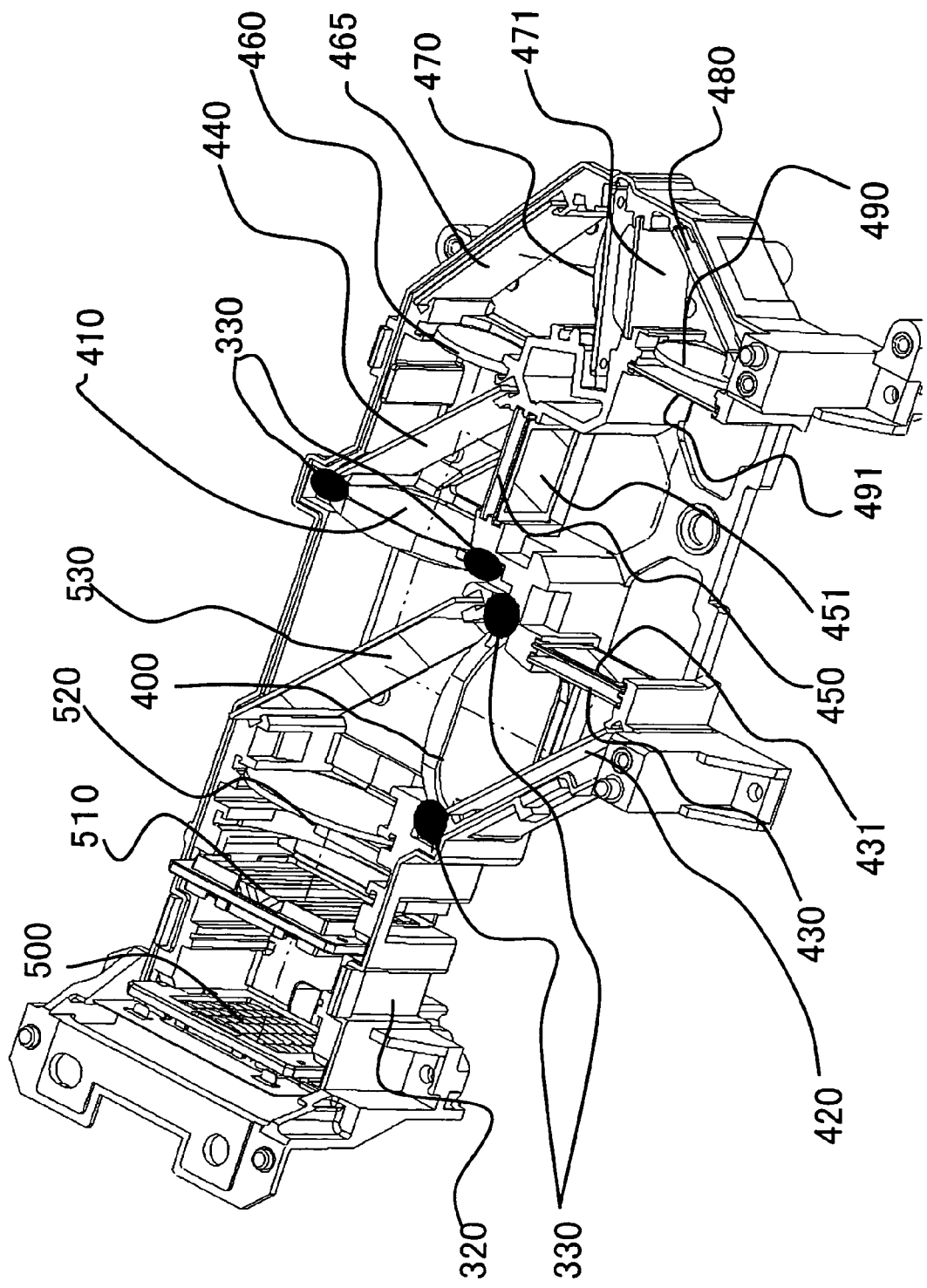
FIG. 4 is a perspective view showing the internal structure of the optical engine unit in the projection type image display apparatus according to the first embodiment of the present invention.

FIG. 4 shows detailed structure of the spectroscope means and the light guide means of the optical engine unit of the projection type image display apparatus 1 of the first embodiment according to the present invention shown in FIG. 1.

In FIG. 4, optical components constituting the spectroscope means and the light guide means of the optical engine unit are mounted within an optical engine case 320 constituted by a rigid body.

Processing of light coming from the illumination means is first described in sequence. The light coming from the illumination means (not shown) passes through a multi-lens A portion 500 into the optical engine case 320. The light further passes through a multi-lens B portion 510 and a focus lens A portion 520 and impinges on a dichroic mirror A 530. The dichroic mirror A 530 is, for example, an R-reflection/GB-transmission dichroic mirror. An R-light component of the light is reflected by the dichroic mirror A 530 to be directed to a focus lens B portion 400 and a GB-light component thereof passes through the dichroic mirror A 530 and is directed to a focus lens C portion 410. The light passing though the focus lens B portion 400 is reflected by a total reflection mirror 420 and passes through an IR cut filter 430 and an R-light polarizing plate 431 for removing infrared rays causing increase of temperature into an R-light liquid crystal panel unit not shown.

The light passing through the focus lens C portion 410 is directed to a dichroic mirror B 440 which is a G-reflection/B-transmission dichroic mirror, so that a G-light component thereof is reflected by the dichroic mirror B 440 and passes through a dichroic filter 450 which is a trimming filter and a G-light polarizing plate 451 into an G-light liquid crystal panel unit not shown. The B-light component thereof passing through the dichroic mirror B 440 is directed to a relay lens A 460 and passes through a total reflection mirror 465, a relay lens B 470, a UV-cut filter for removing ultraviolet rays, a mirror 480, a focus lens 490 and a B-light polarizing plate 491 successively in order of the description into an R-light liquid crystal panel unit not shown.

At this time, the dichroic mirror A 530 and the dichroic mirror B 440 constitute spectroscope means for separating wave components of light into three components. Further, the multi-lens A portion 500, the multi-lens B portion 510, the focus lens A portion 520, the focus lens B portion 400, the focus lens C portion 410, the relay lens A 460, the relay lens B 470 and the focus lens 490 constitute light guide means for guiding illumination light to the liquid crystal panel.

The focus lens B portion 400 and the focus lens B portion 410 constituting part of the light guide means is mounted to the optical engine case 320 of the rigid body. When the optical components are assembled simply, the optical axis is sometimes deviated from the center of the set optical axis so that the illumination range is deviated from the opening range of the liquid panel due to processing accuracy of the optical engine case 320 and the optical components. It is necessary to adjust the position of the focus lens and the relay lens of the light guide means so that the final illumination range is adjusted to align the illumination range with the whole opening range of the liquid crystal panel.

FIG. 4 shows the light guide means having the illumination range adjusted to the proper illumination range and fixedly mounted to the optical engine case 320 of the rigid body by means of the adhesion processing. The lenses are fixedly mounted by adhesion portions 330.

Figure 5:
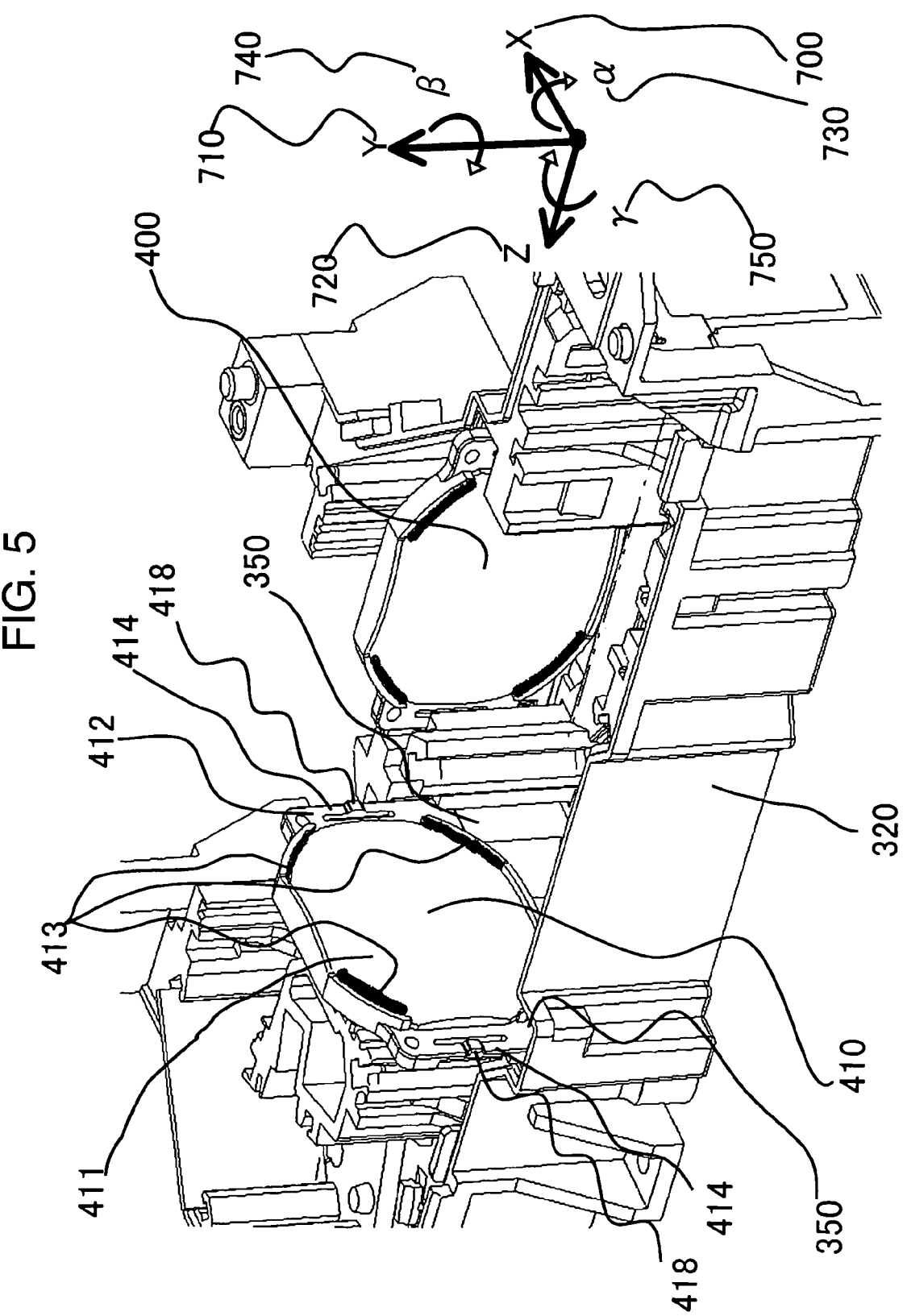
FIG. 5 is a perspective view showing structure around an illustration range adjustment unit of the projection type image display apparatus according to the first embodiment of the present invention.
Figure 6:
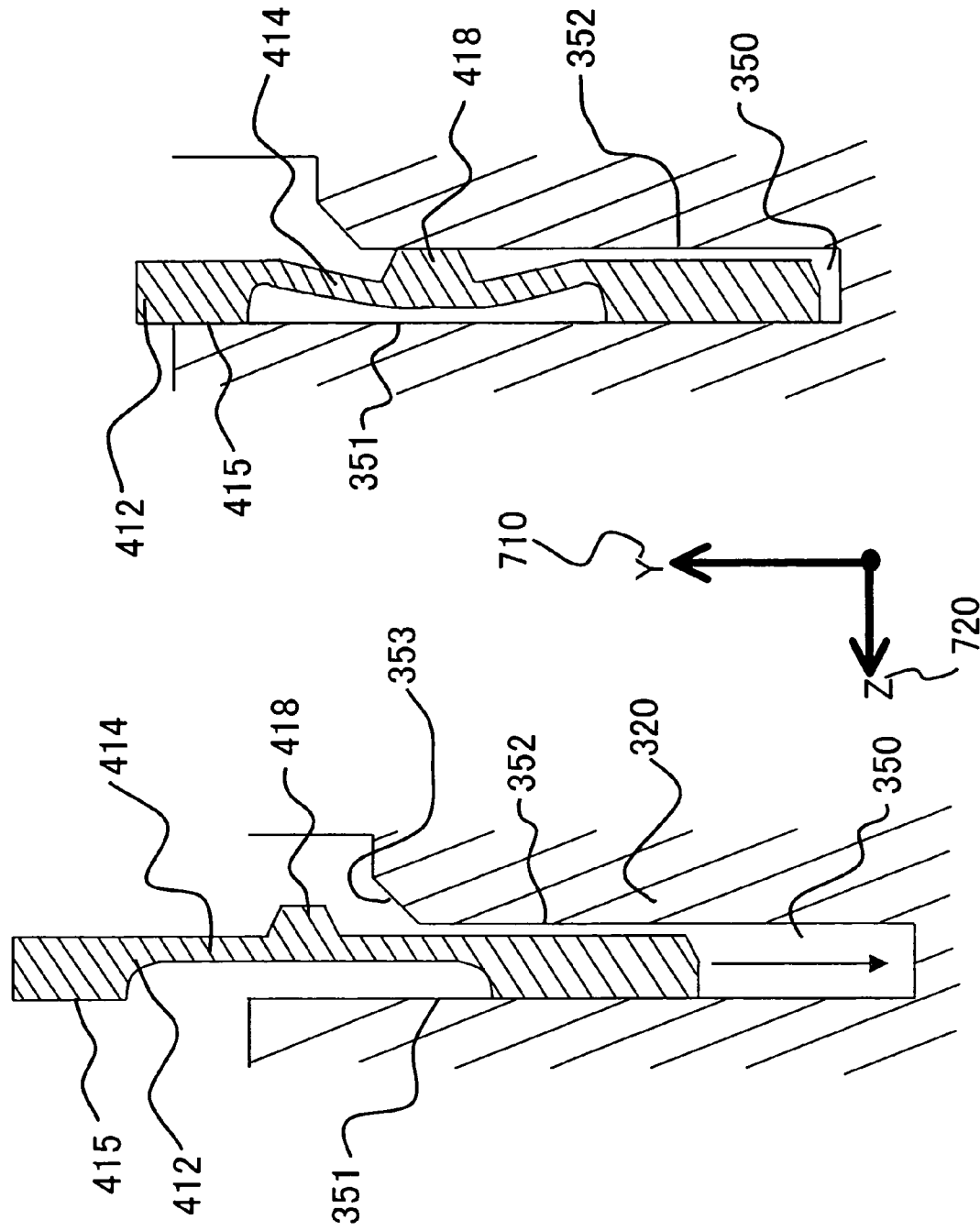
FIGS. 6A and 6B are sectional views showing the illumination range adjustment unit of the projection type image display apparatus according to the first embodiment of the present invention.

The focus lens portion to be adjusted is now described. FIG. 5 shows the periphery of the focus lens of the first embodiment according to the present invention shown in FIG. 1 in detail.

In FIG. 5, the focus lens C portion 410 is not adjusted and the focus lens B portion 400 is temporarily held after adjusted.

The focus lens C portion 410 is composed of a focus lens C 411 and a frame 412. The focus lens C 411 is fixed to the frame by welding processing that a welded portion 413 which is part of the frame 412 made of thermoplastic high-molecular weight material is melted by heat and hardened. In the welding processing, the part of the frame made of thermoplastic high-molecular weight material is heated to the melting point, for example 180° C., or more to be melted or softened and is hardened to the shape matched to that of the set focus lens. At this time, the thermoplastic high-molecular weight material in the melted or softened state is in the state where the internal stress is released and when the material is hardened the lens component can be held by the hardened material without the internal stress. Since the lens component is held to the frame without the internal stress, the positional relation between the frame and the lens component can be kept stably for a long time.

A spring portion 414 is formed on the side portion of the frame 412. A combination of the spring portion 414 and a groove portion 350 formed in the optical engine case 320 of the rigid body constitutes the temporarily holding means upon adjustment.

The adjustment of the spring portion of the frame is now described in detail.

FIGS. 6A and 6B are sectional views showing the state upon adjustment of the illumination range of the first embodiment according to the present invention shown in FIGS. 1A and 1B. FIG. 6A shows the state where it is not adjusted and FIG. 6B shows the state where it is temporarily held after adjusted.

In FIGS. 6A and 6B, a protrusion 418 of the spring portion 414 formed in the frame 412 of the focus lens C portion 410 is protruded from the groove portion 350 formed in the optical engine case 320 of the rigid body in the width direction of the groove portion. The frame 412 is thinner than the width of the groove portion 350 as a whole except the protrusion 418. When the focus lens C portion 410 is tried to be inserted into the groove portion 350, the protrusion 418 is pressed by an inclined plane 353 and the spring portion is bent, so that the protrusion 418 is inserted into the groove portion 350 as shown in FIG. 6B. In the state where the spring portion 414 is bent, as shown in FIG. 6B, a receiving plane 351 of the groove portion 350 comes into contact with a plane 415 of the frame 412 and a pressing plane 352 of the groove portion 350 comes into contact with the protrusion 418 of the spring portion 414 of the frame 412, so that the reaction force of the bent spring portion 414 is received by the receiving plane 351.

In this state, the reaction force of the bent spring portion 414 is received by the pressing plane 352 on the side of the protrusion 418 and is received by the receiving plane 351 on the side of the plane 415 opposite to the protrusion 418.

Frictional force is produced between the plane 415 and the receiving plane 351 and between the protrusion 418 and the pressing plane 352 and the focus lens C portion 410 is stopped at the optical engine case 320 of the rigid body by frictional force. In other words, when any external force except the frictional force is not exerted thereon, the focus lens C portion 410 is not moved.

When any force exceeding the frictional force is exerted on the focus lens C portion 410 by application of external force, the focus lens C portion 410 can be moved against the groove portion 350 and when the external force is removed after movement of the focus lens C portion, the focus lens C portion 410 is held to the groove portion 350 by frictional force between the groove portion and the frame.

Referring again to FIG. 5, the movable direction upon adjustment is described. In FIG. 5, when the optical axis direction is defined to Z-axis 720, the vertical direction to Y-axis 710 and the horizontal direction to X-axis 700, the focus lens C portion 410 cannot be moved in the direction of Z-axis 720 since there is the receiving plane 351. The focus lens C portion 410 can be moved only in the directions of X-axis 700 and Y-axis 710. Further, with respect to the rotation directions of α-direction 730, β-direction 740 and γ-direction 750 to respective axes of X, Y and Z, the focus lens C portion 410 can be rotated only around the Z-axis 720, that is, only in they γ-direction 750. Since the focus lens has a spherical surface actually, the movement in the rotation direction of the focus lens C portion 410 does not influence the illumination position. Accordingly, the focus lens C portion 410 can adjust the range in two directions of X- and Y-axes directions, that is, the range corresponding to the vertical and horizontal directions of the display range of the liquid crystal panel.

As described above, the illumination range of the liquid crystal panel can be adjusted by moving the focus lens. As described with reference to FIG. 6, external force is exerted to adjust the position of the focus lens and the focus lens is temporarily held by frictional force after adjustment. The focus lens is then adhesively fixed after temporarily held to thereby complete the adjustment.

Figure 7:
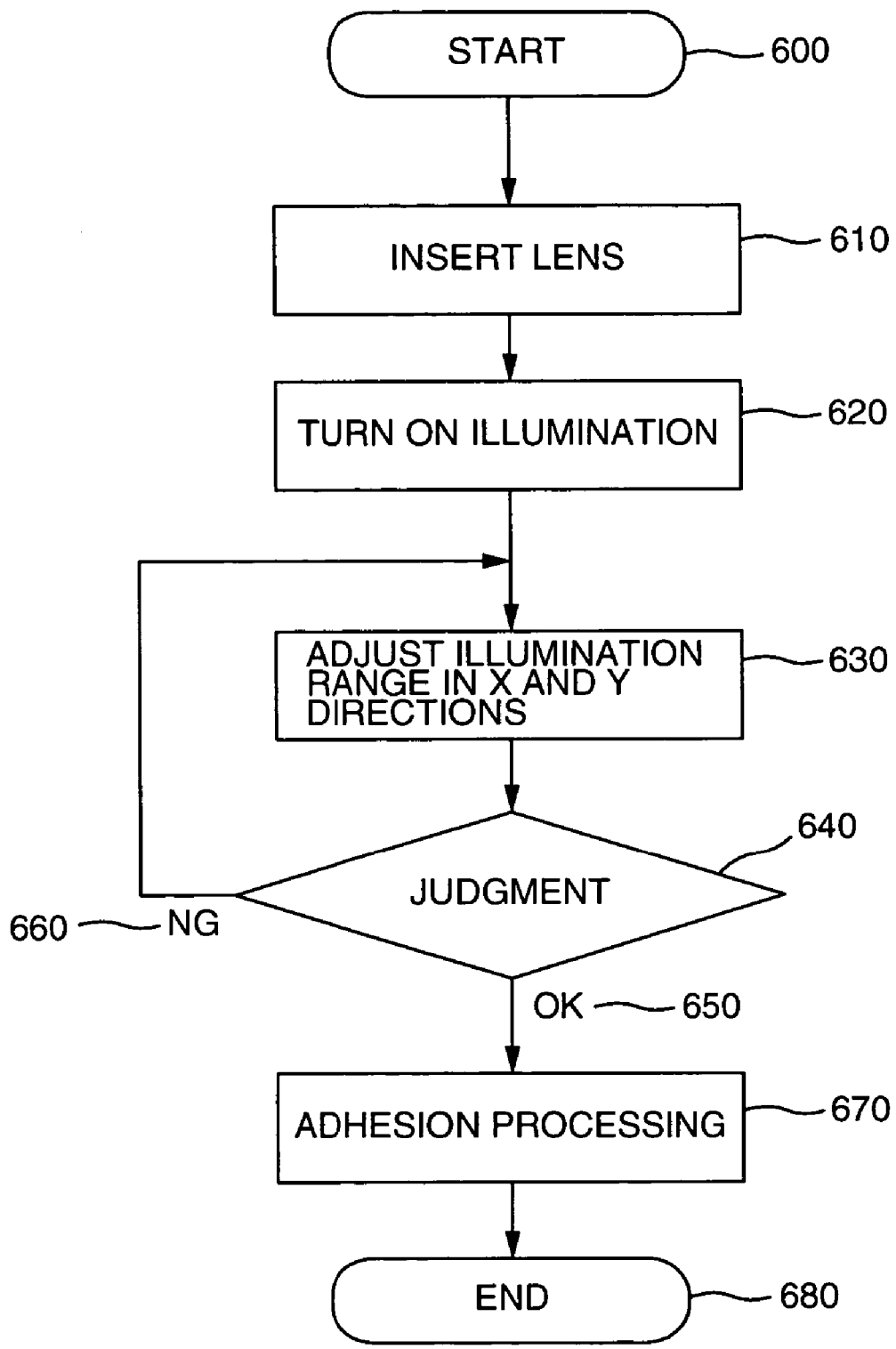
FIG. 7 is a flow chart showing adjustment of the illumination range of the projection type image display apparatus according to the first embodiment of the present invention.

The procedure of adjustment is now described. FIG. 7 is a flow chart showing the adjustment procedure of the first embodiment according to the present invention shown in FIG. 1.

Subsequently to start of the adjustment operation of the illumination range in step 600, the focus lens is inserted into the optical engine case 320 in step 610. At this time, components of the optical system are complete and the illumination light can be applied to the optical engine actually. The illumination means is turned on in step 620 and then the adjustment for setting the illumination range within the range of the display screen of the liquid crystal panel, that is, the positional adjustment of illumination range in the X- and Y-directions is performed in step 630. It is judged whether the illumination range is set within the liquid crystal display screen or not in step 640 as a result of the positional adjustment and when it is judged that the illumination range is not set within the display screen as shown by NG 660, the processing is returned to the adjustment step 630. In the judgment step 640, when it is judged that the illumination range is set within the display screen as shown by OK 650, the processing proceeds to the following adhesion process 670. At this time, the focus lens is held by the spring force of the frame 412 as described with reference to FIGS. 5 and 6. In the adhesion process 670, an adhesive is applied to thereby complete fixing of the focus lens to the optical engine case in step 680.

As described above, the series of adjustment of the illumination range of the focus lens to the liquid crystal display screen can be performed.

Figure 8:
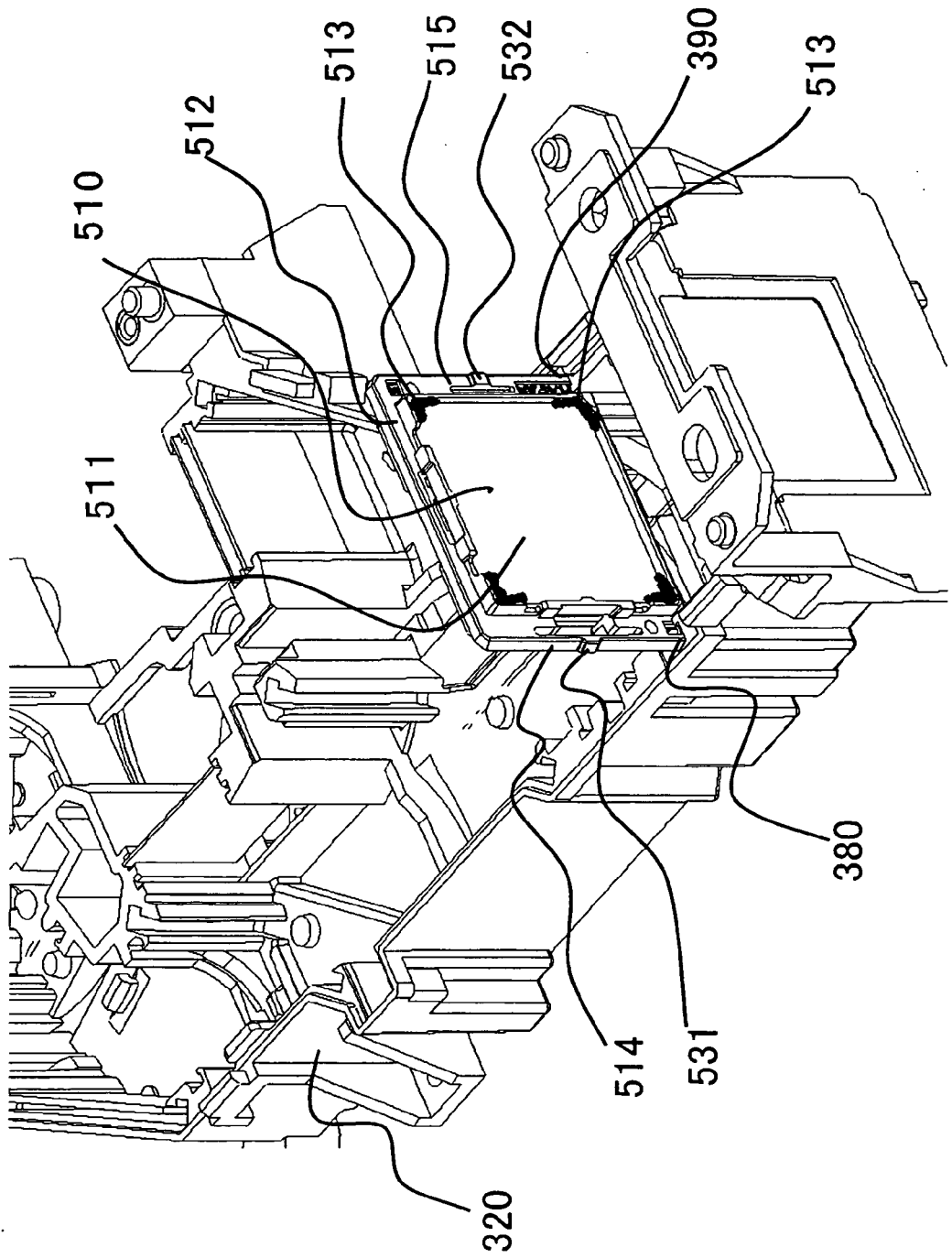
FIG. 8 is a perspective view showing an illumination range adjustment unit of a projection type image display apparatus according to a second embodiment of the present invention.

FIG. 8 is a perspective view showing the outline of a second embodiment according to the present invention.

In FIG. 8, a multi-lens B portion 510 has already been adjusted previously by another adjustment means and the multi-lens B portion 510 is mounted and then fixed to the optical engine case 320 to thereby complete assembling.

The multi-lens B portion 510 is composed of a multi-lens B 511 and a frame 512. The multi-lens B 511 is fixed to the frame by welding processing that a welded portion 513 which is part of the frame 512 made of thermoplastic high-molecular weight material is melted by heat and hardened. In the welding processing, the part of the frame made of thermoplastic high-molecular weight material is heated to the melting point, for example 180° C., or more to be melted or softened and is hardened to the shape matched to that of the set focus lens. At this time, the thermoplastic high-molecular weight material in the melted or softened state is in the state where the internal stress is released and when the material is hardened the lens component can be held by the hardened material without the internal stress. Since the lens component is held to the frame without the internal stress, the positional relation between the frame and the lens component can be kept stably for a long time. The frame 512 and the multi-lens B 511 are fixed by the welding processing as described above after the relation of the optical axis of the multi-lens B 511 and the external shape of the frame 512 has been adjusted previously by another adjustment jig means.

A spring portion A 514 and a spring portion B 515 are formed on the side portion of the multi-lens frame 512. The spring portions, a groove portion A 380 and a groove portion B 390 provided in the optical engine case 320 of the rigid body are combined to constitute a holding mechanism.

The temporarily held state by the spring portions of the multi-lens frame 512 is now described.

FIGS. 9A to 9D are sectional views showing the temporarily held state of the illumination range adjustment mechanism of the second embodiment according to the present invention shown in FIG. 8.

FIG. 9A shows a horizontal section of the multi-lens frame, FIG. 9B a detailed section of an inclined plane pressing portion, FIG. 9C a detailed section of a plane pressing portion and FIG. 9D is a vertical section of the whole frame including the spring portions.

In FIGS. 9A to 9D, a protrusion 531 of the spring portion A 514 and a protrusion 532 of the spring portion B 515 provided in the frame 512 of the multi-lens B portion 510 are inserted into the groove portion A 380 and the groove portion B 390 provided in the optical engine case 320 of the rigid body, respectively, and the spring portions are bent to be pressed against walls of the groove portions.

As shown in FIGS. 9A and 9B, the protrusion 531 of the spring portion A 514 is inclined by a predetermined angle A represented by 710. In the state where the spring portion A 514 is bent, the protrusion 531 of the spring portion A 514 comes into contact with an inclined plane 383 of the groove portion A 380, so that the reaction force of the bent spring portion A 514 is received by the walls on the side of the groove portion A 380 and the groove portion B 390. At this time, since the spring portion A 514 is operated to the inclined plane 383, the reaction force F inclined by the amount corresponding to the predetermined angle A 710 is exerted as shown by 390 in FIG. 9B. The reaction force F 390 is represented by the combination of a component 392 in Z1 direction and a component 391 in X1 direction.

The component 392 in the Z1 direction is a component in the optical axis direction (not shown) and acts as the force of pressing a plane 516 of the multi-lens frame 512 against a plane 384 of the groove portion 380.

The remaining component 391 in the X1 direction is a component in the direction of the groove portion B 390 and presses a side portion 371 of the multi-lens frame 512 against a side portion 391 of the groove portion B 390 finally as shown in FIG. 9D.

In the state where the spring portion B 515 is bent, the protrusion 532 of the spring portion B 515 is in contact with a plane A 395 of the groove portion B 390 and reaction force F2 component represented by 396 of the spring portion B 515 presses the plane 516 of the multi-lens frame 512 against an opposite plane B 397 of the groove portion B 390.

In this state, the multi-lens B portion 510 is fixed to the optical engine case 320 by the frictional force caused by the reaction force received from the wall surface and produced by the respective spring force, so that the multi-lens B portion 510 is not moved.

In the temporarily held state, an adhesive is applied to the groove portions, so that the multi-lens B portion 510 can be fixed to the optical engine case 320 permanently.

In the above embodiments, the type liquid crystal panel is described as the light valve means, although the present invention is not limited thereto and it is needless to say that even if other light valve means such as, for example, a reflection type liquid crystal panel and a minute mirror rotation system is used, the apparatus can be structured similarly and the same effects can be attained.

Further, in the above embodiments, the frame functioning as the holder of optical components is made of thermoplastic high molecular weight material, although the present invention is not limited thereto and it is needless to say that even if other material such as alloy having a low melting point is used the same effects can be attained.

Moreover, the thermal welding processing is used as fixing means of the optical component, although even if any welding processing such as ultrasonic welding other than the thermal welding processing is used, the apparatus can be structured similarly and the same effects can be attained as long as part of the frame functioning finally as the holder of the optical component is melted and hardened to the shape matched to that of the optical component.

As described above, according to the present invention, the illumination range can be adjusted to be set to the display range of the light valve means exactly, so that high-grade picture quality can be maintained. Further, after adjustment, the stable positional accuracy can be maintained and the reliability can be ensured for a long time. Further, in the present invention, the holder component for holding the optical component is made of cheap thermoplastic high molecular weight material and accordingly when part of the illumination means is broken or fails, the cheap holder component is destroyed to take out an expensive optical component to be reused, so that the projection type image display apparatus of the low cost as a whole can be provided.

As described above, according to the present invention, the projection type image display apparatus can adjust the illumination range to be set to the display range of the light valve means to thereby maintain the high-grade picture quality.

As described above, according to the present invention, the projection type image display apparatus can ensure the high reliability for a long time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projection type image display apparatus comprising:
illumination means;
plurality of lenses which guide illumination light coming from said illumination means;
a light valve which modulates the illumination light guided through said plurality of lenses;
a projection lens which projects the modulated light from said light valve means; and
a holding member which holds said plurality of lenses; and
an intermediate holding member including a protrusion, a spring portion bent by pressing said protrusion against said holding member, and a frame for mounting one of said plurality of lenses to said intermediate holding member.

2. A projection type image display apparatus according to claim 1, wherein
said intermediate holding member and said holding member each include planes; and
said intermediate holding member is held to said holding member by reaction force of said spring portion in the state where said spring portion is bent and at least part of each of said planes is brought into contact with said spring portion.

3. A projection type image display apparatus according to claim 2, wherein
at least part of said intermediate holding member is made of thermoplastic high-molecular weight material and said lens is fixed to said intermediate holding member by thermal welding of said thermoplastic high-molecular weight material.

4. A projection type image display apparatus according to claim 3, wherein
said intermediate holding member is adhesively fixed to said holding member.

5. A projection type image display apparatus according to claim 4, wherein
said one lens is a multi-lens.

6. A projection type image display apparatus according to claim 4, wherein
said one lens is a focus lens.

7. A projection type image display apparatus according to claim 1, wherein
said intermediate holding member includes a plurality of planes; and
said plurality of planes is brought into contact with said holding member in the state where said spring portion is bent, so that a component of reaction force of said spring portion acts on said plurality of planes to thereby hold said intermediate holding member to said holding member.

8. A projection type image display apparatus according to claim 7, wherein
said intermediate holding member is made of thermoplastic high-molecular weight material.

9. A projection type image display apparatus according to claim 8, wherein
said intermediate holding member is adhesively fixed to said holding member.

10. A projection type image display apparatus according to claim 9, wherein
said one lens is a focus lens.

11. A projection type image display apparatus according to claim 1, wherein
said intermediate holding member is made of thermoplastic high-molecular weight material.

12. A projection type image display apparatus according to claim 1, wherein
at least part of said intermediate holding member is made of thermoplastic high-molecular weight material and said lens is fixed to said intermediate holding member by thermal welding of said thermoplastic high-molecular weight material.

13. A projection type image display apparatus according to claim 1, wherein
said intermediate holding member is adhesively fixed to said holding member.

14. A projection type image display apparatus according to claim 1, wherein
said one lens is a focus lens.

15. A projection type image display apparatus according to claim 1, wherein
said one lens is a multi-lens.

16. A projection type image display apparatus according to claim 1, wherein
said intermediate holding member is made of thermoplastic high-molecular weight material.

17. A projection type image display apparatus according to claim 16, wherein
said intermediate holding member is adhesively fixed to said holding member.

18. A projection type image display apparatus according to claim 17, wherein
said one lens is a multi-lens.

19. A projection type image display apparatus according to claim 17, wherein
said one lens is a focus lens.

20. A projection type image display apparatus according to claim 1, wherein:
said holding member comprises a first inclined plane; and
said intermediate holding member comprises a second inclined plane which faces against said first inclined plane.

* * * * *